United States Patent
Oster et al.

(10) Patent No.: US 10,452,571 B2
(45) Date of Patent: Oct. 22, 2019

(54) MICROELECTRONIC PACKAGE COMMUNICATION USING RADIO INTERFACES CONNECTED THROUGH WAVEGUIDES

(71) Applicant: Intel Corporation, Santa Clara, CA (US)

(72) Inventors: Sasha N. Oster, Chandler, AZ (US); Telesphor Kamgaing, Chandler, AZ (US); Adel A. Elsherbini, Chandler, AZ (US); Georgios C. Dogiamis, Chandler, AZ (US); Brandon M. Rawlings, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/746,318

(22) PCT Filed: Sep. 25, 2015

(86) PCT No.: PCT/US2015/052485
§ 371 (c)(1),
(2) Date: Jan. 19, 2018

(87) PCT Pub. No.: WO2017/052656
PCT Pub. Date: Mar. 30, 2017

(65) Prior Publication Data
US 2018/0217949 A1    Aug. 2, 2018

(51) Int. Cl.
*G06F 13/14*      (2006.01)
*G06F 13/00*      (2006.01)
(Continued)

(52) U.S. Cl.
CPC ........... *G06F 13/14* (2013.01); *G06F 3/14* (2013.01); *G06F 13/00* (2013.01); *H04M 9/06* (2013.01)

(58) Field of Classification Search
CPC ........... G06F 13/14; G06F 3/14; G06F 13/00; H04M 9/06
See application file for complete search history.

(56) References Cited

U.S. PATENT DOCUMENTS

| 9,647,329 B2 * | 5/2017 | Herbsommer ....... H01Q 19/108 |
| 2009/0066597 A1 | 3/2009 | Yang et al. |

(Continued)

OTHER PUBLICATIONS

International Search Report and Written Opinion for International Patent Application No. PCT/US2015/052485 dated Jun. 24, 2016, 16 pgs.

(Continued)

*Primary Examiner* — Jing-Yih Shyu
(74) *Attorney, Agent, or Firm* — Schwabe, Williamson & Wyatt, P.C.

(57) ABSTRACT

Microelectronic package communications are described that use radio interfaces that are connected through waveguides. One example includes an integrated circuit chip, a package substrate to carry the integrated circuit chip, the package substrate having conductive connectors to connect the integrated circuit chip to external components, and a radio on the package substrate coupled to the radio chip to modulate the data over a carrier and to transmit the modulated data. A waveguide connector is coupled to a dielectric waveguide to receive the transmitted modulated data from the radio and to couple it into the waveguide, the waveguide carries the modulated data to an external component.

16 Claims, 6 Drawing Sheets

(51) Int. Cl.
H04M 9/06 (2006.01)
G06F 3/14 (2006.01)

(56) References Cited

U.S. PATENT DOCUMENTS

| | | | | |
|---|---|---|---|---|
| 2011/0068990 | A1* | 3/2011 | Grzyb | H01P 1/042 |
| | | | | 343/772 |
| 2013/0027274 | A1* | 1/2013 | Carpentier | H01Q 13/18 |
| | | | | 343/873 |
| 2013/0109317 | A1 | 5/2013 | Kikuchi et al. | |
| 2014/0285290 | A1* | 9/2014 | Payne | H01P 3/16 |
| | | | | 333/239 |
| 2014/0287703 | A1* | 9/2014 | Herbsommer | H01P 3/16 |
| | | | | 455/90.2 |
| 2015/0185425 | A1* | 7/2015 | Gundel | G02B 6/4292 |
| | | | | 455/90.2 |
| 2015/0295307 | A1* | 10/2015 | Cook | H01Q 1/40 |
| | | | | 343/812 |

OTHER PUBLICATIONS

International Preliminary Report on Patentability for International Patent Application No. PCT/US2015/052485 dated Apr. 5, 2018, 13 pages.

* cited by examiner

MICROELECTRONIC PACKAGE COMMUNICATION USING RADIO INTERFACES CONNECTED THROUGH WAVEGUIDES

CROSS-REFERENCE TO RELATED APPLICATION

This patent application is a U.S. National Phase Application under 35 U.S.C. § 371 of International Application No. PCT/US2015/052485, filed Sep. 25, 2015, entitled "MICROELECTRONIC PACKAGE COMMUNICATION USING RADIO INTERFACES CONNECTED THROUGH WAVEGUIDES," which designates the United States of America, the entire disclosure of which is hereby incorporated by reference in its entirety and for all purposes.

FIELD

The present disclosure relates to communication between devices in a computing system and, in particular, to radio communication through waveguides.

BACKGROUND

In many computer systems multiple integrated circuit chips communicate with each other to perform the programmed operations. The different chips may include central processing units, high speed memories, mass storage devices, chipsets, video processors, and input/output interfaces. Some computers may have more than one of each of these kinds of chips. The chips are traditionally mounted to a motherboard or system board either directly or through a socket or a daughter card.

The chips traditionally communicate using copper interconnects or links that travel through the chip's package vias, through the socket, through the platform motherboard and then back through the socket (or other interconnect) and package of the next chip. In another variation, a flexible connector cable is connected directly between two different packages to bypass the socket and the platform motherboard. This provides a more direct path with fewer interfaces through different connections.

For high performance computing and server platforms the speed of communication between the chip packages and other peripheral or parallel computing systems may limit the overall system performance. The socket, traditionally used to connect chips to a motherboard or system board, has a limited data rate due to the many interfaces for a signal to travel from one chip to the next through a package, the socket, the system board and up through another socket to the other chip. For servers connected through a server backplane, a signal may travel from one chip to another server through a package, the socket, the system board and then to a server backplane or through the motherboard to the backplane. There are additional signal interfaces to connect from the server backplane to the signal's destination. These data signal lines also require physical space in the socket and in the system board.

Flex cables with multiple parallel conductors are used to conduct data signals over short distances between CPUs or between a CPU and another component. The flex cable is attached directly to the chip packages after the chips are socketed in the system board. The package substrate has a cable connector on one or more edges and a cable is attached to each connector. The cable connects two different chip packages together or to a server backplane. This avoids routing the signal through the socket. For longer distances, optical interconnects are expected to be used. In the same way, the package is first socketed to the system board. The package includes an optical fiber connector on the edge of the package substrate and the optical fibers are connected directly to the package substrate.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

As described herein, the mechanical connector on the package may be avoided and replaced by a radio transceiver, such as a millimeter-wave wireless interconnect. The millimeter-wave wireless interconnect can be coupled into a dielectric waveguide for short or long range transmissions. In other embodiments, a mechanical connector may be used but the complexity and precision requirements on the connector may be reduced. The connector may be constructed from looser tolerances. Fewer contact cycles may be required, etc. This is because as described herein, the connector does not make a physical connection to the package data lines but a radio connection.

This solution results in smaller package sizes than currently proposed solutions and dielectric waveguides enable longer distance transmission or higher data rates than purely wireless solutions. It also removes the thermal, alignment, and socketing issues associated with electrical or optical solutions proposed today. The waveguide provides for high data-rate connections off the package without a significant impact on the size of the package. The radio waveguide does not require precision alignment, and has minimal thermal impact.

The millimeter-wave connector that couples the millimeter-wave signal into the dielectric may be implemented in different configurations. In a simplest example, the connector is a collection of dielectric waveguides which couple directly to the package by either direct contact with the package edge or by coupling some distance away. The direct coupling uses a very simple construction. Another example is for the connector to have an antenna on it which couples into a dielectric waveguide. These and other implementations are described in more detail below.

A radio waveguide does not require precision alignment of the antenna or the waveguide. The connector does not degrade after repeated installation and removal and there is very little heat generated in any of the components. In addition, the waveguide allows signals to move around any obstacle that might prevent a radio signal from propagating directly between components.

Figure 1:
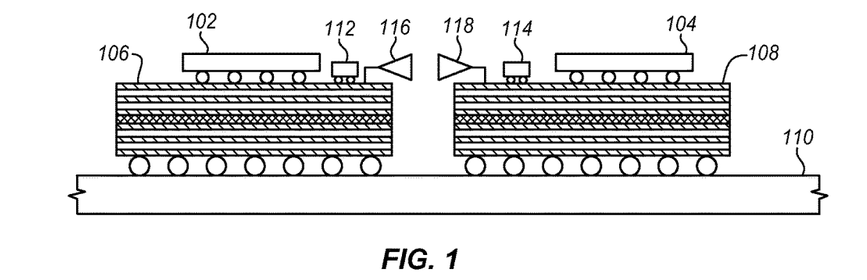
FIG. 1 is a side view cross-sectional diagram of a wireless interconnect for chip-to-chip communications according to an embodiment.

FIG. 1 is a general side view cross-sectional diagram of one example of a wireless interconnect using antennas for chip to chip communication or for free space optics. A first 102 and second 104 integrated circuit (IC) chips are each mounted to a respective package 106, 108 using a ball grid array (BGA), land grid array (LGA), or other connection system including pads, wire leads, or other connectors. The packages are mounted to a printed circuit board (PCB) 110, such as a motherboard, system or logic board or daughter card using a solder ball array or any other desired system. The packages 106, 108 are electrically connected to external components, power, and any other desired devices through traces (not shown) on or in the PCB. The chips may also be connected to each other through the PCB. The packages may be mounted to the PCB using sockets (not shown), depending on the particular implementation.

The first and second chip 102, 104 are discussed herein as being central processing units and, in particular, as server CPUs. However, the techniques and configurations described herein may be applied to many different types of chips for which a high speed communications link would be suitable. In some implementations, the chip may include many different functions such as with a SoC (System on a Chip). In other implementations, the chips may be memory, a communications interface hub, a storage device, co-processor or any other desired type of chip. In addition, the two chips may be different so that one may be a CPU and the other may be a memory or a chipset, for example.

Each chip is also connected through the package to a respective radio 112, 114. The radio may be formed of a single die or a package with multiple dies or using another technique. Each radio is mounted to the package near the edge of the package that is near to the other chip. The package may include copper traces, lines, or layers to connect particular lands, pads, or solder balls of the chip to the radio die for data and control signals. The radio die may also be connected to the chip to provide power to the radio die. Alternatively, the radio die may obtain power from an external source through the package connection to the PCB.

An antenna 116, 118 is also mounted to the package and coupled to the radio. Extremely small antennas may be used that are integrated onto or into the package substrate. The antennas are configured so that when the packages are mounted to the PCB, the antennas are directed to each other. Using steerable array, the antennas may be steered to establish a link between the two packages. The short distance between the antennas allow for a low power and low noise connection between the two chips. The wireless interconnect reduces the complexity of the socket and the complexity of the motherboard for the computing platform.

While different frequencies may be used to suit particular implementations, millimeter wave and sub-THz frequencies allow for an antenna that is small enough to be integrated on the same package that is normally used for the chip. The antennas may also be constructed using the same materials that are used in the fabrication of the package substrate and still exhibit good electrical performance.

In some embodiments, a server may be constructed with multiple CPUs. Each CPU may be mounted to a package with multiple parallel radio die and antenna sets to provide multiple parallel channels within the server between two CPUs. A small antenna size permitted for mm-wave signals allows each antenna of the package for one of the CPUs to be directed to a corresponding antenna on the package for the other CPU. This configuration may be used to combine parallel radio connections and provide Terabit per second data rates.

In some embodiments, a broadband wireless interconnect may be used. For example, with a radio operating in a radio frequency range of from 100-140 GHz, the size of each antenna including the keep out zone can be as small as 1.25×1.25 mm to 2.5×2.5 mm. The actual antenna may be still smaller. Considering a typical server CPU package, more than 30 antennas of 1.25×1.25 mm may be placed along one edge of the package. This would allow more than 30 separate links each carrying 40-80 Gb/s each over a short distance. The separate links may all be used to communicate with a single second chip as shown in FIG. 1 or there may be different package antennas placed next to different antennas of the CPU package. This allows the CPU package to communicate with different chips using different links.

In addition to the simple point-to-point connection of FIG. 1, point-to-multi-point transmission may also be provided without using an external switch matrix. The antennas of multiple chip packages may be positioned within range of the antenna or antennas of one of the CPU packages. The multiple chip packages may all receive the same signal from the CPU package at the same time. In order to control which of the multiple chip package receive a transmission, the radio and antenna system may include beam steering.

Figure 2:
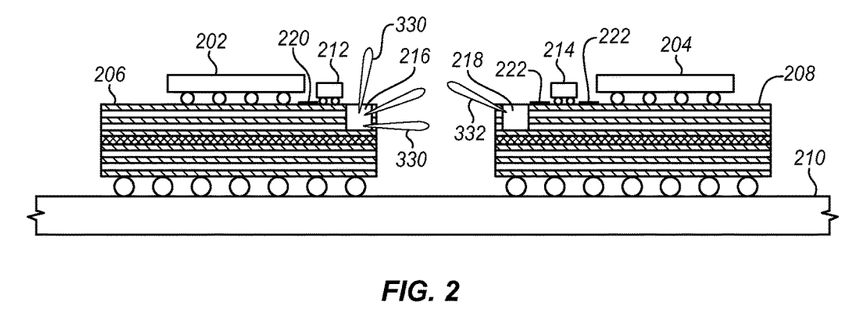
FIG. 2 is a side view cross-sectional diagram of an alternative wireless interconnect for chip-to-chip communications according to an embodiment.

FIG. 2 is a side view cross-sectional diagram of an alternative configuration of a wireless interconnect. As shown a first 202 and a second 204 chip are mounted to respective package substrates 206, 208 which are each mounted to a motherboard 210. Each chip is connected to a respective radio die 212, 214 through its respective package 206, 208. Each radio die 212, 214 is connected to a respective antenna 216, 218. The antennas are positioned to provide a clear and direct wireless connection.

The packaged system may take any of a variety of different forms. One or both of the packages may be a microelectronic module that contains a system on a chip (SoC) or CPU die 202, 204, a millimeter-wave or sub-THz transceiver chip (radio) 212, 214 and an on-package integrated antenna 216, 218. Additional dies and other supporting components such as passives and connectors may also be assembled on the package substrate 206, 208. A SoC die is typically designed and implemented on a low resistivity digital silicon and may also include typical functions found in the baseband portion of a wireless module. If the transceiver or radio die is implemented as a separate die, as shown, then it may be implemented in a high resistivity silicon or on any other type of RF (Radio Frequency) semiconductor substrate including Gallium Arsenide, Gallium Nitride and certain polymers. Alternatively, the radio 212 may be implemented on the primary die 202. A low loss package material processed to have low surface roughness may be used for the package 206 to provide superior electrical performance in the mm-wave and sub-THz frequency range. The package materials may include liquid crystal polymers and its derivatives, prepreg (pre-impregnated fiberglass resin and epoxy), BT (bismaleimide triazine resin epoxy) laminates, other organic substrates, glass, silicon or ceramic.

The wireless interconnect system includes the transceiver chip 206, the on-package antenna 216, 218 and on-package routing 220, 222 to connect the transceiver chip to the main chip and to the antenna. The wireless transmission also uses a wireless receiver on the other package. The receiver system may be a mirror image of the transmitter. For bidirectional transmission, the mm-wave/sub-THz transceiver may have both transmit and receive chains.

Figure 3:
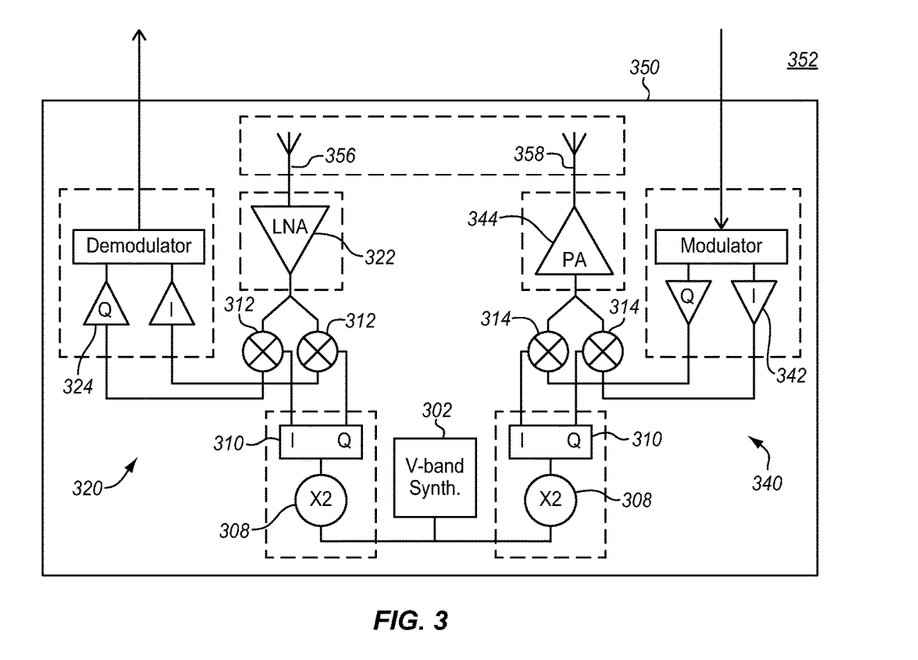
FIG. 3 is a block diagram of a radio chip and related components according to an embodiment.

FIG. 3 is a block diagram of an example of a transceiver or radio chip system architecture and connected components that may be used for the wireless interconnect described herein. The transceiver chip may take a variety of other forms and may include additional functions, depending on the particular implementation. This radio design is provided only as an example. The radio chip 350 is mounted to the package substrate 352 to which the primary integrated circuit die or chip 202, 204 is also mounted as shown in FIG. 1. The substrate 352 is mounted to the PCB or motherboard. The radio package may include a local oscillator (LO) 302 or a connection to an external LO and optionally a switch that allows the external LO feed to be used instead of or in addition to the internal LO. The LO signal may pass an amplifier and multiplier, such as an active doubler 308 and 0/90° quadrature hybrids 310 to drive an upconverter and mixers 314.

The RX (receive) chain 320 may contain a receive antenna 356 in the package coupled to a low noise amplifier (LNA) 322 and a wideband baseband (BB) amplification chain 324 with downconverters 312 for analog to digital conversion. The TX (transmit) chain 340 may include a BB digital driver chain 342 to the upconverters 314, and a power amplifier (PA) 344 to the transmit antenna 358. There may be multiple transmit and receive chains to transmit and receive over multiple channels simultaneously. The various channels may be combined or consolidated in different ways, depending on the particular implementation.

The TX and RX chains are both coupled through the substrate to the antenna. There may be a single antenna for TX and RX or there may be separate RX and TX antennas as shown. The antennas may be designed to have different radiation patterns to suit different wireless connections. In the example of FIG. 2, the first chip's antenna 216 has a wide beam transmit and receive pattern 330. This may allow the chip to communicate with multiple antennas in different locations on the motherboard. The second chip's antenna 218, on the other hand has a narrow beam transmit and receive pattern 332. This allows power to be concentrated in a single direction for communication with just one other device.

Figure 4:
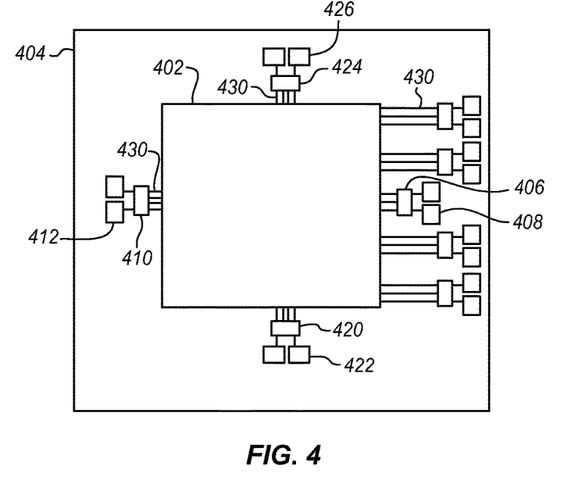
FIG. 4 is a top view diagram of a package with multiple wireless interconnects for chip-to-chip communications according to an embodiment.

FIG. 4 is a top view diagram of an example of an implementation of multiple wireless interconnects on a single microserver package. In this example, separate antennas are used to transmit and receive, but it is also possible to share the antenna between the Tx and the Rx chains. The antenna size may vary from 1.25×1.25 mm or less to 2.5×2.5 mm or more depending on the carrier frequency, desired gain, and transmission range.

A single integrated circuit chip or die 402 includes both processing and baseband systems and is mounted to a package 404. The baseband sections of the chip are coupled through on package traces 430 to radio chips or dies which are in turn coupled through the package to antennas. In this example, the die integrated circuit chip is a CPU for a microserver and is rectangular. There are radio chips on each of the four sides of the CPU. The sides shown as top, left, and bottom in the drawing figure each have a respective radio 406, 424, 410, 420 coupled to a respective Tx, Rx antenna pair 408, 426, 412, 422. The side shown as the right side shows five radios each connected to a respective antenna pair. The number of radios and antennas on each side may be determined based on communication rate needs in each direction.

Very few high speed links may be required on a microserver package. A single link is able to deliver data rates in excess of 40 Gb/s across a distance of a few cm. The data rate may still be on the order of 5-10 Gb/s for transmission distances of up to 50 cm.

FIG. 4 shows many wireless links implemented on the same side of one package. This allows the aggregate data rate to be increased. Alternatively, the data may be sent to different other devices that are in the same general direction. Both the radio chips and the antennas are placed towards the edge of the package to limit obstructions in the radio path that may come from heat sinks and heat spreaders. In general the losses for a copper trace baseband signal are much lower than the losses through the same copper trace for an RF signal. As a result, the radio chips may be kept very close to the antenna. This limits electrical signal and power losses due to the RF routing through the substrate. The radio chip may be installed onto the package in any manner desired and may even be embedded in or a part of the substrate. By using multiple radios, the on-package mm-wave wireless interconnects can be scaled for extremely high data rate applications. This may be useful in systems such as servers and media recording, processing, and editing systems. As shown, multiple links can be put together to achieve data-rates close to a Tb/s.

Figure 5:
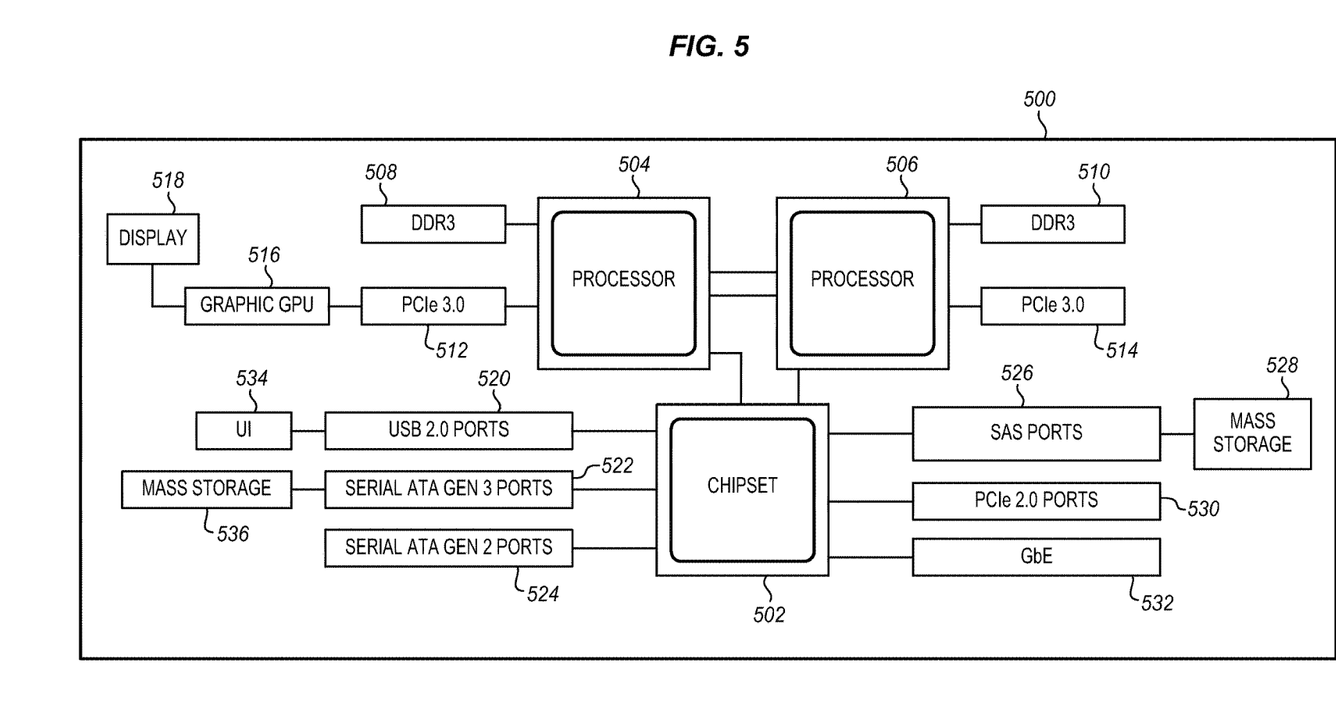
FIG. 5 is a block diagram of a computing system with multiple high speed interfaces according to an embodiment.

FIG. 5 is a block diagram of a computing system 500 with multiple high speed interfaces that may be implemented using the wireless connections as described herein. The computing system may be implemented as a server, microserver, workstation, or other computing device. The system has two processors 504, 506 having multiple processing cores although more processors may be used, depending on the particular implementation. The processors are coupled together through a suitable interconnect such as the wireless interconnect described herein. The processors are each coupled to a respective DRAM (Dynamic Random Access Memory) module 508, 510 using a suitable connection, such as the wireless connection described herein. The processors are also each coupled to a PCI (Peripheral Component Interconnect) interface 512, 514. This connection may also be wired or wireless.

The PCI interfaces allow for connections to a variety of high speed additional components such as graphics processors 516 and other high speed I/O systems for display, storage and I/O. The graphics processor drives a display 518. Alternatively, the graphics processor is core or a die within one or both of the processors. The graphics processor may also be coupled to a different interface through a chipset.

The processors are also both coupled to a chipset 502 which provides a single point of contact for many other interfaces and connections. The connection to the chipset may also be wired or wireless, one or both of the processors may be connected to the chipset, depending on the implementation. As shown, a processor 504 may have a wireless connection to one or more processors 506, memory 508, peripheral components 512, and a chipset 502. These connections may all be wireless as suggested by the multiple radio and antennas of FIG. 4. Alternatively, some of these connections may be wired. The processor may have multiple wireless links to the other processor. Similarly the chipset 502 may have wireless connections to one or more of the processors as well as to the various peripheral interfaces as shown.

The chipset is coupled to USB (Universal Serial Bus) interface 520 which may provide ports for connections to a variety of other devices including a user interface 534. The chipset may be connected to SATA (Serial Advanced Technology Attachment) interfaces 522, 524 which may provide ports for mass storage 536 or other devices. The chipset may be connected to other high speed interfaces such as a SAS (Serial Attached Small computer serial interface) interface 526 with ports for additional mass storage 528, additional PCI interfaces 530 and communications interfaces 532, such as Ethernet, or any other desired wired or wireless interface. The described components are all mounted to one or more boards and cards to provide the described connections.

Figure 6:
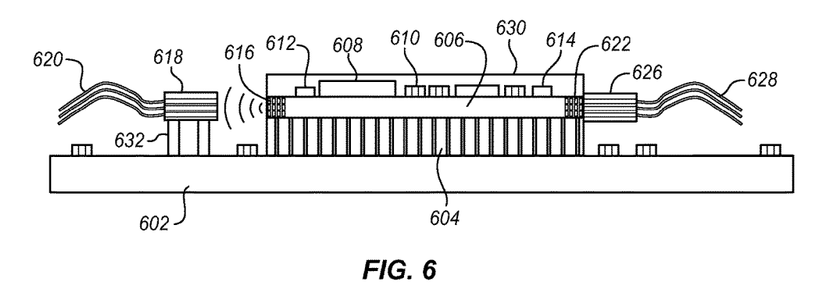
FIG. 6 is a cross-sectional side view diagram of a package on a system board with millimeter wave connectors for dielectric waveguides according to an embodiment.

FIG. 6 is a diagram of a millimeter wave connector using two different approaches for coupling into millimeter wave waveguides. A system board 602 supports a package substrate 6 through an optional socket 604. The package substrate carries one or more dies 608 such as a CPU or other processor, a co-processor, and any associated components such as memory, input/output interfaces, etc., and carries one or more passives 610. The package includes a radio die 612 near an edge of the package substrate as described above. There may be many more radio dies as discussed above and a second radio die 614 is shown on the opposite edge of the substrate. In this particular type of package an integrated heat spreader (IHS) 630 is attached over the top of the die to conduct heat away from the package. However the package may be finished in any way, depending on the implementation.

The radio die 612 as shown on the left is coupled to a radiating element 616 such as a focused directional antenna for millimeter wave transmit and receive. A millimeter wave connector 618 is mounted to the system board 602 near the antenna 616 and in the direct line of sight of the antenna to receive millimeter wave signals from the antenna and to direct millimeter wave signals to the antenna. The connector is mounted to a support stand 632 to carry the connector at a selected distance from the top of the system board 602. The distance or standoff corresponds to the distance of the radiating elements from the top of the system board. The antennas may be configured to direct the modulated data signals downwards or upwards or sideways from the package substrate as well as laterally away from the package substrate. The standoff provided by the stand may be adapted to conform to the direction of radiation of the antennas.

In another embodiment, the millimeter-wave connector 618 may be mounted directly to the system board. This and the other connector mountings may be removable so that the connector may be removed and replaced with different connectors that offer different waveguide functions, different bandwidth, different link lengths, or other features as well as repairs. The additional operations of fabricating and mounting the standoff 632 are avoided. The radiating element may then be configured to direct the signals downwards toward the connector. This presents some benefits in simplicity. However, the connector may be farther from the radiating element and its construction may be more complex. The particular design and location of the connector and radiating element may be adapted to suit different implementations. As shown the waveguide connector 618 is physically separated from the IC chip package and package substrate 606. This allows the package to be installed, removed, and replaced in the socket 604 without affecting the waveguide connector 618. Connections to external components through the waveguides do not require an extra connecting operation with the package.

Figure 7:
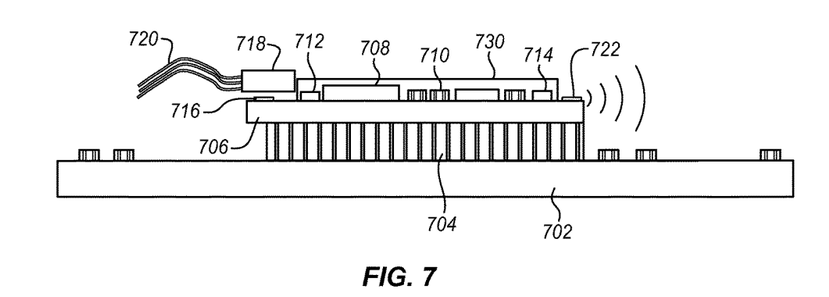
FIG. 7 is a cross-sectional side view diagram of a second example of a package on a system board with millimeter wave connectors to dielectric waveguides according to an embodiment.

In order to increase the signal density, antennas may be stacked within the package substrate or a first antenna may be within the substrate as shown for FIG. 6 and a second may be placed on top of the package substrate as shown in FIG. 7. The antennas may be configured so that the lower antenna is directed downward and the upper antenna is directed upward or sideways. Corresponding connectors may then be stacked with two different standoffs or offsets form the surface of the system board so that one is coupled to the lower antenna and the other is coupled to the upper antenna. Alternatively, a single connector may be used with multiple waveguides spaced apart so as to correspond to the stacked antenna arrays.

The connector 618 is directly coupled to a set of waveguides 620 which carry the millimeter wave signal to another device. At the other end of the waveguide another connector may couple the millimeter wave signals to another chip package similar to the one illustrated.

The radio die 614 shown on the right side of the package is coupled to a radiating element 622. However, instead of the millimeter wave connector being mounted to the system board a short distance away from the antenna as on the left side, in this case, the connector 626 is directly connected to the edge of the package substrate 606 to receive the transmitted modulated data directly from the radio. The waveguide connector 626 is coupled to a set of waveguides 628 in the same way as on the left side to channel the radio signals to and from the radio 614. The waveguide connector is physically mounted directly in front of the transmitting elements 622 of the radio. The data carrier from the radio is then coupled into corresponding antennas of the waveguide connector or directly into waveguides that are held in place by the waveguide connector.

By mounting the connector directly to the package substrate, the system board is simplified and a more secure higher power data connection is realized. On the other hand the waveguide connector can only be attached after the chip package is in place. There may also be space constraints because there must be room allocated on the package substrate for the connector. The left and right connection types are provided as examples, a package may use only one, only the other, or a combination.

As another alternative, the millimeter-wave connector may have an antenna on the connector which couples into the dielectric waveguide. Either the left or right side example can directly replace electrical connectors. The left side connector fastened to the system board allows the package to be replaced without affecting the waveguide connector. The connector may be passive with only a coupling element and the dielectric waveguides. Alternatively, the connector may be active containing its own RF die coupled to a power source to extract the baseband signal with the data and to then retransmit and remodulate that signal into the waveguides. Alternatively, the connector may have an active repeater or amplifier that operates without demodulating the received millimeter wave signal.

FIG. 7 is a side view diagram of a third example implementation of a waveguide connector for a chip package. One or more dies 708, passives 710 and other components are attached to the package substrate 706 and optionally covered by an integrated heat spreader 730, mold compound, or other material or structure. The package is coupled to a system board 702 directly or optionally through a socket 704 as shown. The package includes radio dies 712, 714 coupled to one or more of the dies 708 through the package substrate. The connection is typically through traces on the top surface of the substrate but may be in any other way. The radios receive power through the substrate and communicate data to and from the die 708 through the substrate. The radios modulate the data onto a carrier which is coupled to antennas 716, 722 or radiating elements to radiate the modulated data to another device and to receive modulated data from the other device.

In the example of FIG. 7, the left side radiating element 716 is coupled directly into a waveguide connector 718 which is attached to the top of the package substrate over the radiating element. The waveguide connector feeds the received modulated data into respective waveguides 720 which are coupled to another device (not shown). In FIG. 6, the right side waveguide connector 626 is coupled to a side of the substrate and the corresponding radiating element 622 is built within the layers of the package substrate. However it may be preferred for a variety of reasons including space constraints caused by other components and connections to provide the antenna directly over the package substrate on its top surface as shown. While only a single radiating element is shown and discussed, there may be multiple radiating elements to provide more bandwidth or to provide radio beams in different directions or both. A single antenna system may have multiple elements to provide for beam steering.

In order to simplify the connection to the waveguide connector, the radiating elements 716 may be constructed to direct the data signals upward away from the top surface of the substrate. The waveguide connector may then be attached directly over the antennas. The package substrate traces from the radio die 712 may couple through antennas as shown or directly into the millimeter-wave connector 718 without antennas 716. The connector may be fastened directly over the traces to make a connection.

The right side radio die 714 of the package substrate is also coupled to a radiating element 722 formed or mounted on the top of the package substrate 706. These radiating elements are configured to direct the modulated data laterally away from the side of the substrate. This is the same direction used by the radiating elements of FIG. 6. The modulated data for the right side antennas may be communicated to a nearby waveguide connector 618, a nearby chip package with its own radio and antennas, or to any other desired communication node.

Figure 8:
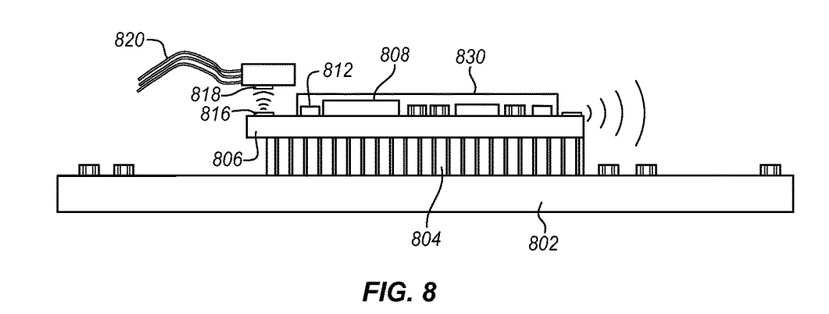
FIG. 8 is a cross-sectional side view diagram of a third example of a package on a system board with millimeter wave connectors according to an embodiment.

FIG. 8 is a cross-sectional side view diagram of another alternative connector configuration. This system is similar to that of FIG. 7 with various dies 808 and passive devices mounted to a package 806 and covered by a heat spreader 830. The package is socketed 804 and attached to a system board 802. On the side shown as the left side of the package a radio die 812 is coupled to a radiating element or antenna 816 which is directed upwards. While the radiation is shown as directly upwards it may also be directed to one side or another depending on the implementation.

While the radios are shown as being on or in the package substrate outside the heat spreader, the radio may alternatively be covered by the heat spreader or cover. The heat spreader may be made of a material that allows the radio waves to propagate through the heat spreader. Alternatively the heat spreader may have a small section near the radios that is formed of an alternative material that allows the radio waves to propagate through the small section. Instead of an alternative material, the small section may also be a hole, window, or gap in the heat spreader through which the radio waves may propagate.

A millimeter-wave connector 818 is mounted in the direct line of sight of the radiating element shown as directly above the radiating elements. The connector couples the signals into dielectric waveguides 820 for connection to another device. The connector can be assembled to the package substrate through guide pins, a clamp mechanism, or any of a variety of other ways, depending on the particular implementation.

Figure 9:
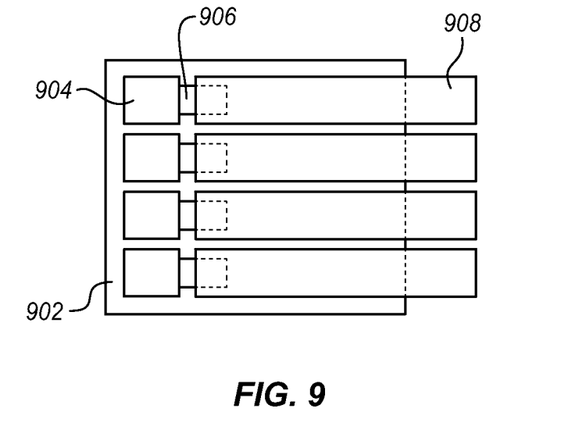
FIG. 9 is a top view diagram of a millimeter wave to waveguide connector according to an embodiment.

FIG. 9 is a top view diagram of a millimeter wave connector suitable for use in the diagrams as shown. The connector is built on a substrate 902 which may be formed of any dielectric material. A moderately flexible dielectric such as polyimide may be used or a more rigid material such as glass or silicon oxide may be used. The substrate is adapted to be fastened to the package substrate or to a support stand. This may be done using removable fasteners (not shown) or an adhesive.

At one side and along the edge of the substrate 902, the connector has a series of radiating elements 904 or antennas. These may be formed in the substrate as slotted waveguide antennas, as deposited metal structures, as microstrip, or in any other suitable way. These antennas communicate with the antennas of the chip package to receive and transmit the modulated data signals from the chip package. The antennas may be formed by applying a conductive element to the surface of the substrate. This may be done by deposition, or using an adhesive with pre-formed materials. The antennas may be formed from copper, aluminum, or any other suitable conductive material. The radiating elements have a transition side opposite the edge of the substrate that transitions the radio wave from the antennas to the waveguides 908.

Figure 10:
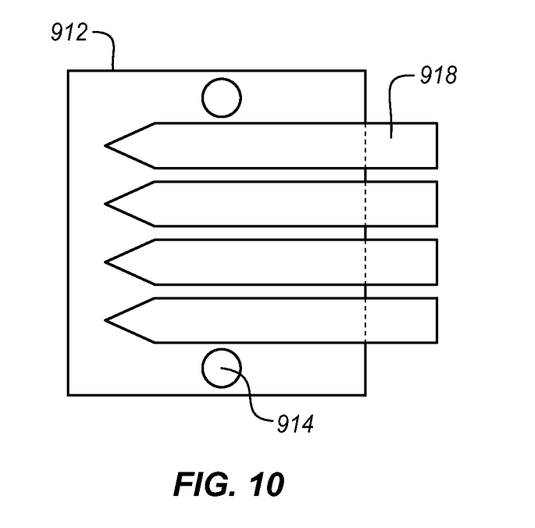
FIG. 10 is a top view diagram of an alternative millimeter wave to waveguide connector according to an embodiment.

FIG. 10 is a top view diagram of an alternative millimeter-wave connector with a substrate 912. In this case dielectric waveguides 918 are formed on or in or attached to the substrate. These waveguides do not have metallic radiating elements or waveguide transitions. Instead the radiating element of the package substrate carries signals or transmits and receives signals directly into and out of the waveguides. This configuration is particularly suited for close range communications or for mounting directly over traces or radiating elements of the package substrate. The substrate also shows alignment pins 914 to allow the substrate to be aligned and attached to a standoff, the package substrate, a bracket, or some other holder. The configuration of FIG. 9 may also include alignment pins, slots, tabs, or another guide mechanism.

The waveguides 908, 918 are shown in FIGS. 9 and 10 as rectangular for illustration purposes. In addition to the rectangular waveguides, cylindrical or other waveguide shapes may be used as well. The waveguides may be solid or hollow. A hollow dielectric waveguide may have a hole at the center and a dielectric surrounding outside the hollow center. In some implementations, the hole is filled with air, vacuum, or a material with an extremely low dielectric constant and/or loss tangent. The surrounding dielectric may be a single material or a multilayer composite. Metal coatings may be used in at least one of the layers to reduce signal leakage and cross-talk when multiple waveguides are used in parallel.

In one embodiment, the waveguide transitions 906 of FIG. 9 are substrate integrated waveguides (SIWs). SIWs have metal walls on four sides and metallic. These can be fabricated in a substrate using two rows of slots that electrically connect to metal plates using planar processing techniques. The physical dimensions are a function of the desired frequency and bandwidth. A SIW would be designed to support the same modes as the attached dielectric waveguide. Any of a variety of other types of transitions may be used instead. A variety of filters and couplers (not shown) may also be formed into the millimeter-wave connector.

For communication within a platform, the waveguide length may be on the order of tens of centimeters. For intra- and inter-rack communication, the waveguide may be as long as ten or more meters. A dielectric waveguide may be able to support data rates of 40 Gbps on a single waveguide, depending on the center frequency and bandwidth. A communication interface as shown herein may use multiple waveguides running in parallel to support multiple 100 Gbps data rates.

The waveguide dimensions may be adapted to suit any particular operational wavelengths. The material properties, the waveguide geometry, and the signal integrity properties may also influence the waveguide design. As an example, a rectangular 60 GHz waveguide connector made of polystyrene could have the dimensions of 5 mm (wide)×1.5 mm (thick) for a length of 10 cm. The length (distance of propagation) depends heavily on signal characteristics and data rate, but are on the order of tens of centimeters. A repeater may be used to increase the possible distance. These signals may be coupled into a receiving element or antenna on a backplane.

Figure 11:
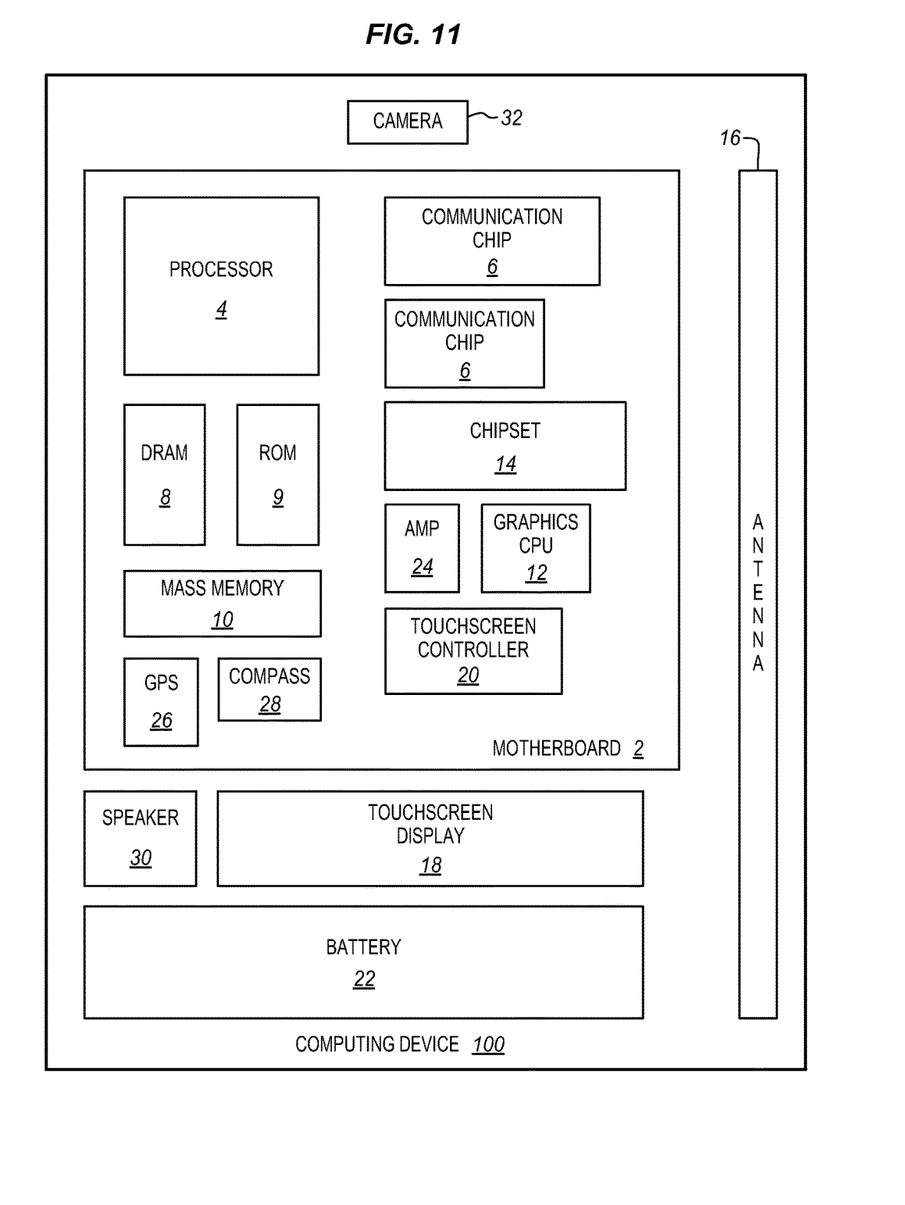
FIG. 11 is a block diagram of a computing device incorporating wireless interfaces according to an embodiment.

FIG. 11 illustrates a computing device 100 in accordance with another implementation. The computing device 100 houses a board 2. The board 2 may include a number of components, including but not limited to a processor 4 and at least one communication chip 6. The processor 4 is physically and electrically coupled to the board 2. In some implementations the at least one communication chip 6 is also physically and electrically coupled to the board 2. In further implementations, the communication chip 6 is part of the processor 4.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication chip 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication chips 6. For instance, a first communication chip 6 may be dedicated to shorter range wireless communications such as Wi-Fi and Bluetooth and a second communication chip 6 may be dedicated to longer range wireless communications such as GPS, EDGE, GPRS, CDMA, WiMAX, LTE, Ev-DO, and others.

In some implementations, any one or more of the components may be adapted to use the wireless connection described herein. The features of the system of Figure may be adapted to that of FIG. 3 and vice versa. For example, the system of FIG. 11 may carry multiple processors. The system of FIG. 11 may include any one or more of the peripherals shown in FIG. 11. The term "processor" may refer to any device or portion of a device that processes electronic data from registers and/or memory to transform that electronic data into other electronic data that may be stored in registers and/or memory.

In various implementations, the computing device 100 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 100 may be any other electronic device that processes data including a wearable device.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to an apparatus that includes an integrated circuit chip, a package substrate to carry the integrated circuit chip, the package substrate having conductive connectors to connect the integrated circuit chip to external components, a radio on the package substrate coupled to the radio chip to modulate the data over a carrier and to transmit the modulated data, and a waveguide connector coupled to a dielectric waveguide to receive the transmitted modulated data from the radio and to couple it into the waveguide, the waveguide to carry the modulated data to an external component.

In further embodiments the waveguide connector has an antenna to receive the transmitted modulated data and a waveguide transition to couple the received data from the antenna into the waveguide.

In further embodiments the antenna is formed of microstrip coupled to the waveguide.

In further embodiments the connector comprises a substrate, wherein the antenna is formed of a metal plate deposited on the substrate, the connector further comprising a transition between the metal plate and the waveguide, the transition comprising slots formed in the substrate with metal walls formed in the slots.

In further embodiments the package substrate is carried by a system board and wherein the waveguide connector is carried by the system board and wherein the waveguide connector is physically separated from the package substrate.

Further embodiments include a radio antenna coupled to the radio and wherein the transmitted modulated data is coupled directly from the radio antenna into the waveguide.

In further embodiments the radio antenna is on a top surface of the package substrate and wherein the waveguide connector is connected to the package substrate over the radio antenna.

In further embodiments the radio is formed within layers of the package substrate and is connected to the package substrate through metal layers of the package substrate.

In further embodiments the waveguide connector is connected to an edge of the package substrate to receive the transmitted modulated data from the radio.

In further embodiments the waveguide connector comprises a copper antenna and a waveguide transition from the copper antenna to the waveguide.

In further embodiments the waveguide connector comprises a flexible dielectric substrate, a plurality of antennas formed on the substrate by metal deposition, and a plurality of dielectric waveguides attached to the substrate using an adhesive and coupled to the antennas.

In further embodiments the dielectric waveguides comprise hollow dielectric material with a solid dielectric surrounding a hollow center.

Some embodiments pertain to a computing device that includes a system board, a central processing unit (CPU), a package substrate mounted to the system board to carry the CPU, the package substrate having conductive connectors to connect the CPU to external components, a radio on the package substrate coupled to the CPU to modulate the data onto a carrier and to transmit the modulated data, a waveguide connector coupled to a dielectric waveguide to receive the transmitted modulated data from the radio and to couple it into the waveguide, the waveguide to carry the modulated data to an external component, and a chipset carried by the system board coupled through the system board to the integrated circuit chip through the package.

Further embodiments include a second CPU, a second package substrate mounted to the system board to carry the CPU, a second waveguide connector to receive the modulated data from the first CPU through the waveguide, and a second radio on the package substrate to receive the modulated data from the waveguide, to demodulate the data from the carrier and to transmit the demodulated data to the second CPU.

In further embodiments the system board radio comprises a plurality of radio dies, the apparatus further comprising a dielectric substrate having a series of antennas each having a wiring element to connect to a respective radio die, each radio die being coupled to a respective waveguide.

In further embodiments the series of antennas are formed as slotted waveguide antennas using metal structures deposited on the dielectric substrate.

Some embodiments pertain to an apparatus that includes a system board, an integrated circuit chip package mounted to the system board having an integrated circuit chip, a radio and conductive connectors to connect the chip to the radio, the radio to modulate data from the chip onto a carrier and to transmit the modulated data away from the package, the radio further to receive modulated data, to demodulate the received data and transmit the demodulated data to the chip, a first waveguide connector on the system board to receive the transmitted modulated data from the first radio and to couple the received modulated data into a waveguide, and a second waveguide connector coupled to the waveguide to connect the received modulated data in the waveguide to a remote device.

In further embodiments the remote device comprises a radio of a second integrated circuit chip package.

In further embodiments the first waveguide connector comprises a substrate attached to the system board, a metal plate antenna attached to the substrate, a waveguide transition formed in the substrate coupled to the plate antenna, and a dielectric waveguide attached to the substrate and coupled to the waveguide transition.

Further embodiments include a plurality of additional radios connected to the chip to transmit data to a plurality of different external components.

The invention claimed is:

1. An apparatus comprising:
an integrated circuit chip;
a package substrate to carry the integrated circuit chip, the package substrate having conductive connectors to connect the integrated circuit chip to external components;
a radio die on the package substrate and coupled to the integrated circuit chip through the package substrate, the radio die to modulate data over a carrier and to transmit the modulated data; and
a waveguide connector coupled to a dielectric waveguide to receive the transmitted modulated data from the radio die and to couple it into the dielectric waveguide, the dielectric waveguide to carry the modulated data to an external component;

wherein the waveguide connector has an antenna to receive the transmitted modulated data and a waveguide transition to couple the received data from the antenna into the dielectric waveguide.

2. The apparatus of claim 1, wherein the antenna is formed of microstrip coupled to the dielectric waveguide.

3. The apparatus of claim 1, wherein the waveguide connector comprises a substrate, wherein the antenna is formed of a metal plate deposited on the substrate, the waveguide connector further comprising a transition between the metal plate and the dielectric waveguide, the transition comprising slots formed in the substrate with metal walls formed in the slots.

4. The apparatus of claim 1, wherein the package substrate is carried by a system board and wherein the waveguide connector is carried by the system board and wherein the waveguide connector is physically separated from the package substrate.

5. The apparatus of claim 1, further comprising a radio antenna coupled to the radio die and wherein the transmitted modulated data is coupled directly from the radio antenna into the dielectric waveguide.

6. The apparatus of claim 5, wherein the radio antenna is on a top surface of the package substrate and wherein the waveguide connector is connected to the package substrate over the radio antenna.

7. The apparatus of claim 5, wherein the waveguide connector is connected to an edge of the package substrate to receive the transmitted modulated data from the radio die.

8. The apparatus of claim 1, wherein the waveguide connector comprises a copper antenna and a waveguide transition from the copper antenna to the dielectric waveguide.

9. The apparatus of claim 1, wherein the waveguide connector comprises a flexible dielectric substrate, a plurality of antennas formed on the flexible dielectric substrate by metal deposition, and a plurality of dielectric waveguides attached to the flexible dielectric substrate using an adhesive and coupled to the plurality of antennas.

10. The apparatus of claim 9, wherein the plurality of dielectric waveguides comprise hollow dielectric material with a solid dielectric surrounding a hollow center.

11. A computing device comprising:
a system board;
a central processing unit (CPU);
a package substrate mounted to the system board to carry the CPU, the package substrate having conductive connectors to connect the CPU to external components;
a radio die on the package substrate and coupled to the CPU through the package substrate, the radio die to modulate data onto a carrier and to transmit the modulated data;
a waveguide connector coupled to a dielectric waveguide to receive the transmitted modulated data from the radio die and to couple it into the dielectric waveguide, the dielectric waveguide to carry the modulated data to an external component; and
a chipset carried by the system board coupled through the system board to the integrated circuit chip through the package substrate;
wherein the system board comprises a plurality of additional radio dies, the apparatus computing device further comprising a dielectric substrate having a series of antennas each having a wiring element to connect to a respective radio die, each radio die being coupled to a respective dielectric waveguide.

12. The computing device of claim 11 further comprising:
a second CPU;
a second package substrate mounted to the system board to carry the second CPU;
a second waveguide connector to receive the modulated data from the first CPU through the dielectric waveguide; and
a second radio die on the second package substrate to receive the modulated data from the dielectric waveguide, to demodulate the data from the carrier and to transmit the demodulated data to the second CPU.

13. The computing device of claim 11, wherein the series of antennas are formed as slotted waveguide antennas using metal structures deposited on the dielectric substrate.

14. An apparatus comprising:
a system board;
an integrated circuit chip package mounted to the system board having an integrated circuit chip, a radio die and conductive connectors to connect the integrated circuit chip to the radio die through the package substrate, the radio die to modulate data from the integrated circuit chip onto a carrier and to transmit the modulated data away from the package substrate, the radio die further to receive modulated data, to demodulate the received data and transmit the demodulated data to the integrated circuit chip;
a first waveguide connector on the system board to receive the transmitted modulated data from the] radio die and to couple the received modulated data into a waveguide; and
a second waveguide connector coupled to the waveguide to connect the received modulated data in the waveguide to a remote device;
wherein the first waveguide connector comprises a substrate attached to the system board, a metal plate antenna attached to the substrate, a waveguide transition formed in the substrate coupled to the metal plate antenna, and a dielectric waveguide attached to the substrate and coupled to the waveguide transition.

15. The apparatus of claim 14, wherein the remote device comprises a radio of a second integrated circuit chip package.

16. The apparatus of claim 14, the package substrate further comprising a plurality of additional radios connected to the integrated circuit chip to transmit data to a plurality of different external components.

* * * * *